United States Patent
Chesnokov (10) Patent No.: US 10,462,478 B2
(45) Date of Patent: Oct. 29, 2019

(54) METHOD OF VIDEO GENERATION

(71) Applicant: Apical Ltd, Cambridge (GB)

(72) Inventor: Viacheslav Chesnokov, Cambridge (GB)

(73) Assignee: Apical Limited, Cambridge (GB)

(*) Notice: Subject to any disclaimer, the term of this patent is extended or adjusted under 35 U.S.C. 154(b) by 3 days.

(21) Appl. No.: 15/691,360

(22) Filed: Aug. 30, 2017

(65) Prior Publication Data
US 2018/0098084 A1    Apr. 5, 2018

(30) Foreign Application Priority Data
Sep. 30, 2016 (GB) .................................. 1616687.8

(51) Int. Cl.
| | | |
|---|---|---|
| *H04N 11/02* | (2006.01) | |
| *H04N 19/513* | (2014.01) | |
| *H04N 19/44* | (2014.01) | |
| *H04N 19/172* | (2014.01) | |
| *H04N 19/46* | (2014.01) | |
| *H04N 19/132* | (2014.01) | |
| *H04N 19/136* | (2014.01) | |

(Continued)

(52) U.S. Cl.
CPC ......... *H04N 19/513* (2014.11); *H04N 19/132* (2014.11); *H04N 19/136* (2014.11); *H04N 19/162* (2014.11); *H04N 19/172* (2014.11); *H04N 19/44* (2014.11); *H04N 19/46* (2014.11); *H04N 19/59* (2014.11); *H04N 19/85* (2014.11)

(58) Field of Classification Search
CPC .................................................... H04N 19/513
USPC ....................................... 375/240.01–240.29
See application file for complete search history.

(56) References Cited

U.S. PATENT DOCUMENTS

| | | | | |
|---|---|---|---|---|
| 5,177,797 A | * | 1/1993 | Takenaka | ............... H04N 19/60 |
| | | | | 348/403.1 |
| 8,274,588 B2 | * | 9/2012 | Mabuchi | ........... H01L 27/14654 |
| | | | | 348/297 |

(Continued)

FOREIGN PATENT DOCUMENTS

| | | |
|---|---|---|
| EP | 2579591 A1 | 4/2013 |
| WO | 2014025294 A1 | 2/2014 |
| WO | 2015193114 A1 | 12/2015 |

OTHER PUBLICATIONS

UKIPO Search Report dated Mar. 13, 2017 for GB Application No. GB1616687.8.

*Primary Examiner* — Leron Beck
(74) *Attorney, Agent, or Firm* — EIP US LLP (57) ABSTRACT

A method for generating an output video frame is provided. The method includes receiving an encoded video. The method includes decoding the encoded video whereby to produce a decoded video frame. The method includes retrieving first video frame data from a first group of pixels of the decoded video frame. The method includes retrieving second video frame data from a second group of pixels, different to the first group of pixels, of the decoded video frame. The method includes generating an output video frame by combining information derived from the first video frame data and information derived from the second video frame data. The combining includes, for a given pixel of the output video frame, combining information describing the given pixel derived from the first video frame data and information describing the given pixel derived from the second video frame data.

15 Claims, 7 Drawing Sheets

(51) Int. Cl.
*H04N 19/162* (2014.01)
*H04N 19/85* (2014.01)
*H04N 19/59* (2014.01)

(56) References Cited

U.S. PATENT DOCUMENTS

| | | | |
|---|---|---|---|
| 8,447,132 B1* | 5/2013 | Galil | G06K 9/00228 |
| | | | 358/1.9 |
| 9,204,033 B2* | 12/2015 | Tamaki | G02B 7/32 |
| 2005/0074163 A1* | 4/2005 | Shaked | H04N 1/6086 |
| | | | 382/162 |
| 2006/0119613 A1* | 6/2006 | Kerofsky | G09G 3/22 |
| | | | 345/590 |
| 2008/0055426 A1* | 3/2008 | Pertsel | H04N 5/2351 |
| | | | 348/223.1 |
| 2009/0109306 A1* | 4/2009 | Shan | H04N 5/235 |
| | | | 348/273 |
| 2010/0215094 A1* | 8/2010 | Wang | H04N 19/176 |
| | | | 375/240.2 |
| 2010/0283861 A1 | 11/2010 | Tamagawa | |
| 2010/0328490 A1* | 12/2010 | Kurane | H04N 5/2355 |
| | | | 348/229.1 |
| 2011/0096216 A1* | 4/2011 | Kawai | G03B 7/091 |
| | | | 348/296 |
| 2011/0194618 A1* | 8/2011 | Gish | G06T 5/50 |
| | | | 375/240.25 |
| 2012/0236020 A1* | 9/2012 | Paris | G06T 5/009 |
| | | | 345/589 |
| 2013/0321671 A1* | 12/2013 | Cote | H04N 5/365 |
| | | | 348/241 |
| 2014/0112394 A1 | 4/2014 | Sullivan et al. | |
| 2014/0152686 A1* | 6/2014 | Narasimha | G09G 5/377 |
| | | | 345/589 |
| 2014/0347532 A1* | 11/2014 | Kang | H04N 5/351 |
| | | | 348/294 |
| 2015/0003584 A1* | 1/2015 | Weisfield | G01T 1/2018 |
| | | | 378/62 |
| 2015/0172529 A1* | 6/2015 | Aota | H04N 5/2357 |
| | | | 348/228.1 |
| 2015/0201138 A1* | 7/2015 | Hiwada | H04N 5/35581 |
| | | | 348/272 |
| 2015/0350514 A1* | 12/2015 | Zhai | H04N 5/2355 |
| | | | 348/222.1 |
| 2016/0360134 A1* | 12/2016 | Miyake | H01L 27/14603 |
| 2016/0381274 A1* | 12/2016 | Liu | H04N 5/2355 |
| | | | 348/362 |

* cited by examiner

METHOD OF VIDEO GENERATION

CROSS-REFERENCE TO RELATED APPLICATION

The present application claims priority to Great Britain Application No. GB 1616687.8, filed Sep. 30, 2016, the entire contents of which are incorporated by reference herein.

TECHINCAL FIELD

The present disclosure relates to methods, apparatus and computer programs for encoding, decoding and displaying a video.

BACKGROUND

It is frequently desirable to encode a video, for example to compress the video. Encoded videos may be transmitted for decoding at a receiver, for example as streaming video.

SUMMARY

According to a first aspect, there is provided a method for generating an output video frame. The method includes receiving an encoded video, decoding the encoded video whereby to produce a decoded video frame, retrieving first video frame data from a first group of pixels of the decoded video frame, retrieving second video frame data from a second group of pixels, different to the first group of pixels, of the decoded video frame, and generating an output video frame by combining information derived from the first video frame data and information derived from the second video frame data. The combining includes for a given pixel of the output video frame, combining information describing the given pixel derived from the first video frame data and information describing the given pixel derived from the second video frame data.

In an example, the first video frame data includes a representation of pixel values of an input video frame. Generating the output video frame may then include upscaling the representation to a display resolution.

In some examples, the second video frame data defines processing that may be applied to the first video frame data, whereby to generate the output video frame, and the combining information for the given pixel includes applying the processing to the information describing the given pixel derived from the first video frame data. In some such examples, the second video frame data includes gain information, and the processing includes application of at least one gain, based on the gain information, to the first video frame data. The second group of pixels may have an area less than one fifth of a corresponding area of the first group of pixels.

According to a further aspect, there is presented a method for encoding a video, the method including receiving information describing an input video frame, processing the input video frame to generate first video frame data and second video frame data. Some information relating to a given pixel of the input video frame is placed in the first video frame data and other information relating to the given pixel of the input video frame is placed in the second video frame data. The method includes storing the first video frame data in a first group of pixels of a video frame to be encoded, storing the second video frame data in a second group of pixels, different to the first group of pixels, of the video frame to be encoded, and generating an encoded video, the generating including encoding the video frame to be encoded.

The first video frame data may include a representation of pixel values of the input video frame. In such an example, storing the representation may include downscaling the pixel values of the input video frame to a resolution corresponding to an area of the first group of pixels. The downscaling may be a horizontal downscaling, such that the first group of pixels has a width less than the width of the input video frame. In this example, the second group of pixels may be at one side of the first group of pixels. In some examples, the second video frame data defines image processing applied to the input video frame.

According to a further aspect, there is provided a non-transitory computer-readable storage medium including a set of computer-readable instructions stored thereon which, when executed by at least one processor, cause the at least one processor to receive an encoded video, decode the encoded video whereby to produce a decoded video frame, retrieve first video frame data from a first group of pixels of the decoded video frame, retrieve second video frame data from a second group of pixels, different to the first group of pixels, of the decoded video frame, and generate an output video frame by combining information derived from the first video frame data and information derived from the second video frame data. The combining includes for a given pixel of the output video frame, combining information describing the given pixel derived from the first video frame data and information describing the given pixel derived from the second video frame data.

According to some aspects, there is provided an apparatus for displaying streamed video, the apparatus including a receiver configured to receive a streamed encoded video, a decoder configured to, in real time, decode the encoded video whereby to produce a decoded video frame, a processor configured to, in real time: retrieve from a first group of pixels of the decoded video frame a representation of pixel values of an input video frame, retrieve from a second group of pixels of the decoded video frame, different to the first group of pixels, a representation of processing that may be applied to the representation of pixel values, and generate an output video frame, wherein the generating includes applying the processing to the representation of pixel values, and an output configured to, in real time, output the output video frame to a display.

There is further provided an apparatus including an input configured to receive an input video frame, and a processor configured to: store, in a first group of pixels of a video frame to be encoded, first video frame data including a representation of pixel values of the input video frame, store, in a second group of pixels of the video frame to be encoded, different to the first group of pixels, second video frame data defining processing that may be applied to the first video frame data whereby to produce a display video frame, and generate an encoded video, the generating including encoding the video frame to be encoded. The apparatus may include a transmitter configured to transmit the encoded video to a receiver.

Further features and advantages of the present disclosure will become apparent from the following description of preferred embodiments, given by way of example only, which is made with reference to the accompanying drawings.

DETAILED DESCRIPTION

Figure 1:
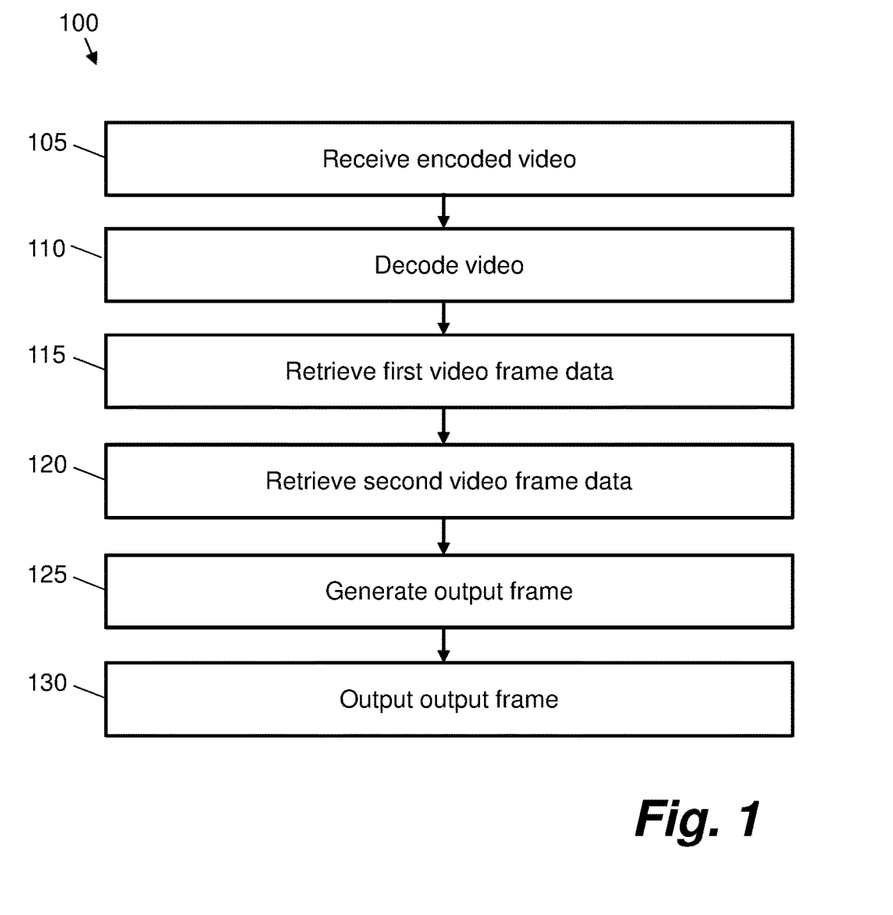
FIG. 1 shows a flow diagram of a method for generating a video frame according to an example.

FIG. 1 shows a flow diagram of a method 100 for generating an output video frame. The method comprises a receiving step 105 in which an encoded video is received. The video may for example be encoded using a known encoding method such as H.264 or H.265 encoding. The method then comprises a step 110 of decoding the encoded video, whereby to produce a decoded video frame. For example, where the video is encoded using H.264 encoding, the decoding step comprises using an H.264 decoder. Such a decoder may for example produce a series of decoded frames.

The method 100 then comprises a first retrieving step 115 and a second retrieving step 120. The first retrieving step 115 comprises retrieving first video frame data from a first group of pixels of the decoded video frame. The second retrieving step 120 comprises retrieving second video frame data from a second group of pixels, different to the first group of pixels, of the decoded video frame.

The method 100 then comprises a generating step 125, comprising generating an output video frame by combining information derived from the first video frame data and information derived from the second video frame data. The combining comprises, for a given pixel of the output video frame, combining information describing the given pixel derived from the first video frame data and information describing the given pixel derived from the second video frame data.

Finally, the method 100 comprises a step 130 of outputting the output video frame.

Figure 2:
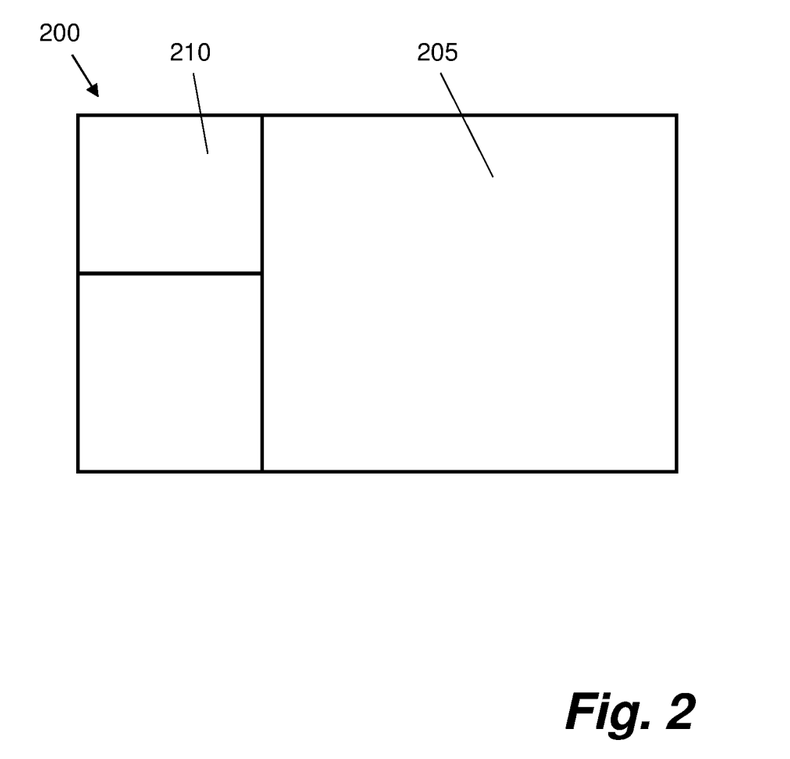
FIGS. 2 and 3 show schematic representations of decoded video frames.

FIG. 2 shows a schematic representation of a decoded video frame 200 according to an example. In this example, the first group of pixels is a first region 205 and the second group of pixels is a second region 210. In other examples, the first and second groups of pixels are interspersed with each other, for example in sub-groups of pixels. The first and second groups of pixels may be positioned alongside each other as shown in FIG. 2 or may have other relative orientations as will be described in more detail below.

In some examples, the first video frame data comprises a representation of pixel values of an input video frame, wherein the input video frame is a frame of a video prior to encoding, for example a raw video captured from a camera. For example, the first video frame data may comprise each pixel value of the input video frame, or data allowing each pixel value of the input video frame to be reconstructed such as a lossless compression of the input video frame. Alternatively, the first video frame data may comprise a lossy compression of the input video frame. For example, the first video frame data may comprise a downscaled version of the input video frame. Examples of such downscaling include vertical downscaling, horizontal downscaling, and combined horizontal and vertical downscaling. Such downscaling may for example be performed by cubic interpolation.

In examples, wherein the first video frame data comprises a representation of pixel values of the input video frame, generating the output video frame may comprise upscaling the representation to a display resolution, for example the standard high definition resolution of 1920×1080. In some such examples, wherein the representation is a downscaled representation of the input video frame, the display resolution is equal to the resolution of the input video frame.

In further such examples, metadata is associated with the encoded video. The metadata may identify the first group of pixels as a region of interest. The output video frame may then be generated based on the first video frame data, as identified in the metadata as a region of interest, and not on the second video frame data. This may for example allow an output video frame to be produced by a device that is not configured to process the second video frame data. For example, where the second video frame data defines processing that may be applied to the first video frame data as described below, a device that is not configured to perform such processing may generate the output video frame based on the first video frame data without performing the processing.

In some examples, the second video frame data defines processing that may be applied to the first video frame data, whereby to generate the output video frame. Generating the output video frame may then comprise applying the processing to the first video frame data. In particular, the combining information for a given pixel may comprise applying the processing to the information describing the given pixel derived from the first video frame data. For example, the second video frame data may comprise gain information and the processing may comprise application of at least one gain, based on the gain information, to the first video frame data. In some examples, a compression artefact removal algorithm is applied to the first video frame data prior to applying the processing defined by the second video frame data.

Figure 3:
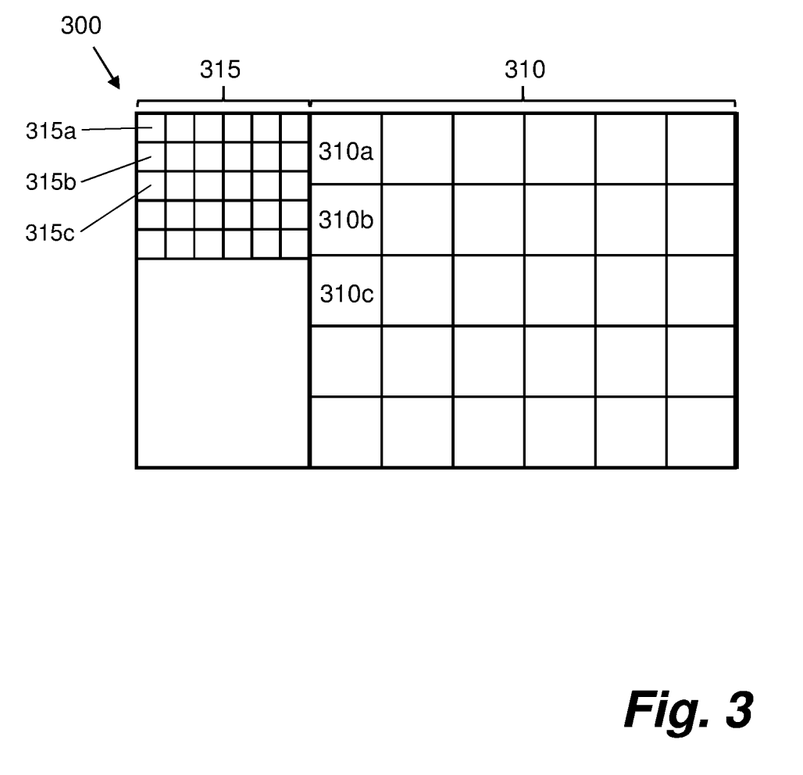

FIG. 3 shows a schematic representation of a decoded frame 300 according to one such example. The frame 300 comprises a first group of pixels 310 in a first region and a second group of pixels 315 in a second region. The first group of pixels 310 comprises sub-regions including sub-regions 310a, 310b and 310c. Each of these sub-regions comprises one or more pixels of the frame 300. The second group of pixels 315 comprises sub-regions including sub-regions 315a, 315b and 315c. Each of these sub-regions comprises one or more pixels of the frame 300.

The sub-regions of the second group of pixels 315 form a gain map indicating gains to be applied to corresponding sub-regions of the first group of pixels 310. For example, sub-region 315a of the second group 315 indicates a gain to apply to sub-region 310a of the first group 310. Likewise, sub-regions 315b and 315c indicate gains to apply to sub-regions 310b and 310c, respectively.

In some examples, the input video frame is a high dynamic range frame. Generation of the encoded video may comprise locally tone mapping the input frame. The locally tone mapped input frame is thus a representation of the high dynamic range input frame in a format with a more limited dynamic range. For example, the high dynamic range input frame may be a 10-bit frame, and the locally tone mapped frame derived from this may be an 8-bit frame. The gains may be determined during the tone mapping as gains to apply during generation of the output video frame to approximate the appearance of the original high dynamic range frame. In some examples, the gains may comprise attenuation values. These may be represented as gain values less than 1. In such examples, a gain map as described above may alternatively be termed an attenuation map. For example, the tone mapped input frame may be a full brightness tone mapped image and the gain information may describe brightness attenuation values to apply to the full brightness tone mapped image. In such examples, the receiver typically applies the gain derived from a given sub-region 315a, 315b, 315c of the second group of pixels 315 to each pixel of the corresponding sub-region 310a, 310b, 310c of the first group of pixels 310.

In some such examples, it is desirable to adjust the strength of the tone mapping when generating the output video frame. This has the effect of changing the perceived brightness of the output video frame. For example, a user may select a desired strength. Alternatively, or additionally, the strength may be selected automatically, for example in response to a detection of ambient light conditions or to reduce power usage. As another example, the strength may be selected to increase perceived brightness to compensate a reduction in actual brightness, for example when operating in a power saving mode. The desired strength may be implemented by application of an effective gain based on the gain value determined from the second group of pixels 315 and the desired strength. For example, the effective gain may be determined by alpha blending of determined gain and strength, i.e.:

$$A^* = \text{strength}*A + (1-\text{strength}) \qquad \text{(Eq. 1)}$$

where $A^*$ is the effective gain, A is the gain determined from the second group of pixels 315, and the strength is variable from 0 to 1. The values from 0 to 1 may for example be expressed as an 8-bit integer.

Gains as described above may be determined, during local tone mapping, for each pixel of a locally tone mapped frame. In many video frames, the local gains determined during tone-mapping vary slowly across the frame. This may be exploited by assigning the second group of pixels 315 a smaller area than the first group of pixels 310, for example as shown in FIG. 3. The second group 315 may thus be stored as a downscaled representation of the determined gains. As a consequence of the aforementioned slow variation of the gains across the frame, a relatively significant degree of downscaling can be used without significant detriment to perceived quality of the output video frame. For example, the second group of pixels may have an area less than one fifth of a corresponding area of the first group of pixels. In one advantageous example, the second group of pixels has an area around one eighthieth of the area of the first group of pixels. Where the first and second groups are contiguous regions, as shown in FIGS. 2 and 3, this may be achieved by implementing a 9:1 ratio between the dimensions of the first region and the corresponding dimensions of the second region, leading to an 81:1 ratio of their respective areas.

The method 100 comprising decoding of the encoded video and generation of the output video frame may be performed in real time. For example, a video may be stored in an encoded format in a memory, and output video frames generated in real time and displayed as a user watches a video. In some examples, the video comprises streaming video, for example received from an online streaming service. Output video frames may then be generated from the received streamed video as described above.

Figure 4:
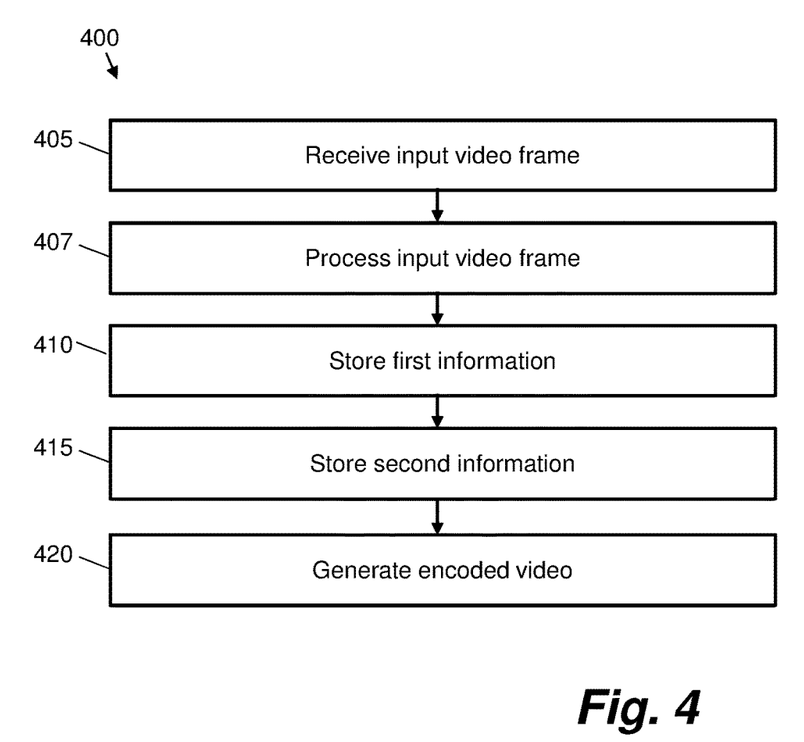
FIG. 4 shows a flow diagram of a method for encoding a video according to an example.

FIG. 4 shows a flow diagram of a method 400 for encoding a video according to an example. The method 400 comprises a receiving step 405 wherein information describing an input video frame is received. For example, the information may be received from a camera or from a memory or other storage. In some examples, for example as described above, the input video frame is a high dynamic range frame and the method comprises locally tone mapping the input video frame. In such examples, the method may comprise determining gain information associated with the locally tone mapped frame, for example for generating a display frame as described above. In other examples, the input video frame may be received as a locally tone mapped version of an original high dynamic range video frame. Associated gain information may be received with the locally tone mapped frame.

The method further comprises a processing step 407. The processing step comprises processing the input video frame to generate first video frame data and second video frame data, wherein some information relating to a given pixel of the input video frame is placed in the first video frame data and other information relating to the given pixel of the input video frame is placed in the second video frame data.

The method 400 then comprises storage steps 410 and 415. Storage step 410 comprises storing the first video frame data in a first group of pixels of a video frame to be encoded. For example, the first video frame data may comprise a representation of pixel values of the input frame as described above. Storage step 415 comprises storing the second video frame data in a second group of pixels, different to the first group of pixels, of the video frame to be encoded. The second video frame data may for example comprise gain information as described above. The first and second groups of pixels may comprise contiguous regions, for example as described above in relation to FIGS. 2 and 3. Alternatively, the first and second groups of pixels may be non-contiguous. For example, they may comprise interlaced regions of the video frame to be encoded.

The method 400 may comprise applying gamma correction, which may also be termed global tone mapping. In one such example, the method 400 comprises applying gamma correction to the input video frame. In other such examples, the method 400 comprises applying gamma correction to the first group of pixels of the video frame to be encoded. This has the effect of boosting detail in bright regions while losing some detail in dark regions, which may result in an improvement in perceived video quality.

The method 400 then comprises a step 420 of generating an encoded video, the generating comprising encoding the video frame to be encoded. For example, the encoding may be H.264 encoding as noted above.

In some examples, wherein the second video frame data comprises local gain information, the gain information comprises an inverse of each gain value. As an illustrative example, a bright region could have a low associated gain of 1, and a dark region could have a high associated gain of 16. Storing the inverse of each of these values typically reduces the severity of floating point errors for low gain values during the encoding step. A consequence of this is a decrease in compression artefacts in bright regions and a corresponding increase in compression artefacts in dark regions. As dark regions typically have a greater incidence of noise than bright regions, this may increase perceived image quality.

The second video frame data, for example local gain information, may be stored as brightness values of the pixels of the second group. Many standard encoders, such as the H.264 encoder mentioned above, store brightness as a luma value. Frequently, luma values are stored at full resolution whereas chroma values, comprising colour information, are stored at a reduced resolution. The present method may thus allow accurate reconstruction of the second video frame data following decoding of the encoded video.

Figure 5:
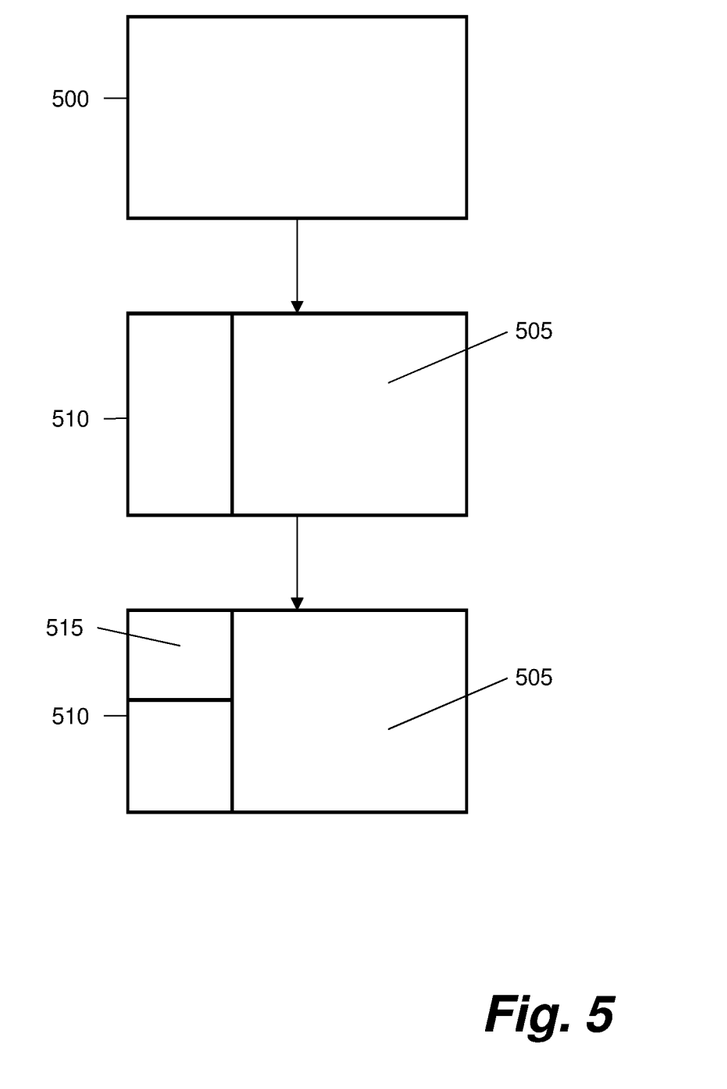
FIG. 5 shows a schematic representation of downscaling video frame data.

In some examples, wherein the first video frame data comprises a representation of pixel values of the input video frame, storing the representation comprises downscaling the pixel values of the input video frame to a resolution corresponding to an area of the first group of pixels. FIG. 5 shows a schematic representation of such a downscaling, wherein pixels of an input video frame 500 are stored as a downscaled representation in a first group of pixels 505 of a video frame to be encoded 510. The downscaling may for example be performed by cubic interpolation. Although FIG. 5 shows a horizontal downscaling, other downscaling schemes are envisaged. For example, the downscaling may be a vertical downscaling, or a combined horizontal and vertical downscaling. Horizontal downscaling typically has less impact on perceived video quality than vertical or combined downscaling. The second video frame data is then stored in a second group of pixels 515 of the video frame to be encoded 510. Where the downscaling is a horizontal downscaling or a combined horizontal and vertical downscaling, the second group of pixels 515 may be stored at one side of the first group of pixels 505, as shown in FIG. 5. Analogously, where the downscaling is a vertical downscaling or a combined horizontal and vertical downscaling, the second group of pixels 515 may be stored above and/or below the first group of pixels 505.

In some examples, as shown in FIG. 5, the downscaling and storing is such that the video frame to be encoded 510 has the same resolution as the input video frame 500. This may for example be a standard resolution, such as 1920× 1080. This allows the encoded video to have similar properties, such as file size, as an encoded video produced directly from input video frames such as the frame 500. An advantage of such an example is that the encoded video may be transmitted to a receiver using infrastructure that is already optimised for transmission of video of that resolution. As such, an existing system may be updated to implement the present method by way of a software update, with no change of encoder/decoder firmware or hardware, or video transmission infrastructure. Furthermore, as the second video frame data is stored in the frame instead of, for example, as metadata, there is no increase in required metadata storage space and/or transmission bandwidth.

In other examples, the video frame to be encoded 510 has a larger resolution than the input video frame 500. This allows the representation of pixel values to be downscaled to a lesser degree, or to not be downscaled. A consequence of this is that, where the input video frame has a standard resolution, the video frame to be encoded will generally have a non-standard resolution. A further consequence is that higher storage, bandwidth and processing power will be required to store, transmit and encode/decode the video.

In further examples, the second group of pixels in the video frame to be encoded may correspond to an otherwise unused group of pixels in the input video frame. For example, a widescreen video may be transmitted as a "letterboxed" video at a non-widescreen resolution, with each frame comprising blank bands above and/or below an image-containing portion. The second group of pixels may thus comprise a group of pixels in one or both of these blank bands. This allows the video frame to be encoded to have the same resolution as the input video frame, whilst requiring no downscaling of the image-containing pixel values of the input video frame.

As described above in relation to the method of FIG. 1, the second video frame data may define image processing to be applied to a decoded video frame whereby to generate an output video frame, such as gain information. Alternatively, or additionally, the second video frame data may define image processing applied to the input video frame. For example, the second video frame data may define areas of the input video frame to which image processing techniques, such as line detection or sharpening algorithms, have been applied.

Figure 6:
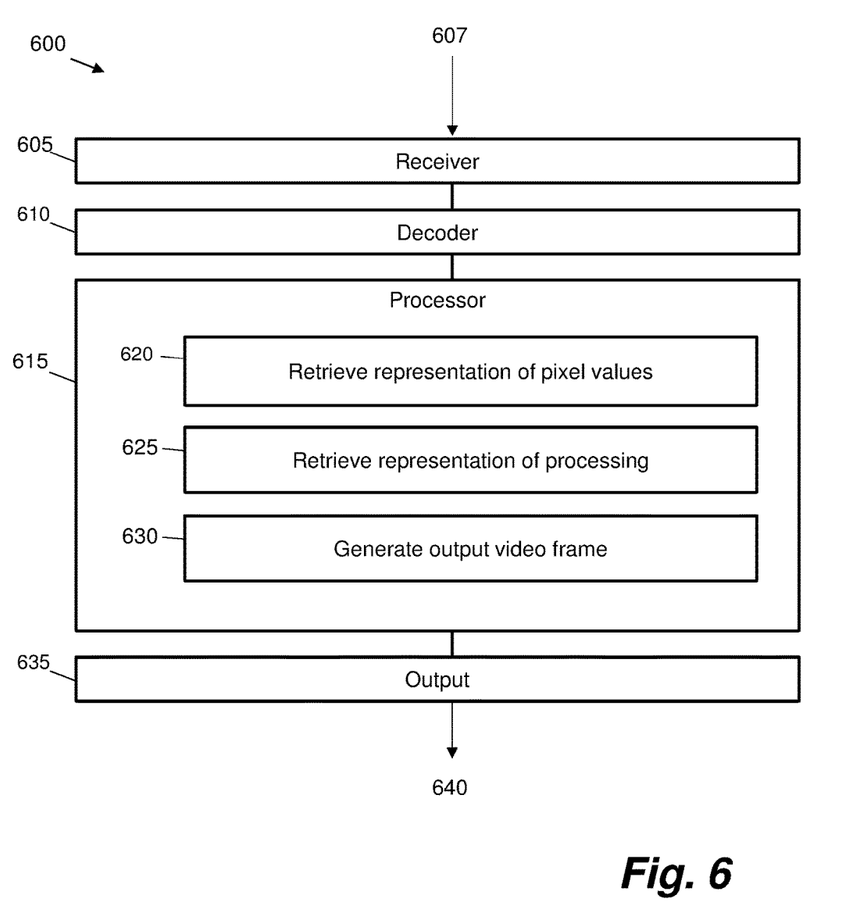
FIG. 6 is a schematic representation of an apparatus for displaying streamed video according to an example.

FIG. 6 is a schematic representation of an apparatus 600 for displaying streamed video in accordance with aspects of the present disclosure. The apparatus 600 comprises a receiver 605 configured to receive a streamed encoded video 607. The video may for example be received via a wired and/or wireless network from a streaming server.

The apparatus 600 comprises a decoder 610 configured to, in real time, decode the encoded video 607 whereby to produce a decoded video frame, for example as described above in relation to FIG. 1.

The apparatus 600 further comprises a processor 615. The processor 615 could for example be a central processing unit or a graphics processing unit. The processor 615 is configured to, in real time, retrieve 620 from a first group of pixels of the decoded video frame a representation of pixel values of an input video frame. The representation may be a downscaled representation as described above. The processor 620 is further configured to, in real time, retrieve 625 from a second group of pixels of the decoded video frame, different to the first group of pixels, a representation of processing that may be applied to the representation of pixel values. In some examples, the representation comprises gain values that may be applied to the pixel values as described above. The processor 630 is then configured to, in real time, generate an output video frame, wherein the generating comprises applying the processing to the representation of pixel values. The apparatus 600 further comprises an output 635 configured to, in real time, output the output video frame 640 to a display.

The receiver 605, decoder 610, processor 615 may be elements of a computer. The display may be an element of the same computer, or an external display. In some examples, the apparatus 600 is a mobile device such as a mobile telephone or tablet. In such examples, the display may be an integrated display of the mobile device.

Figure 7:
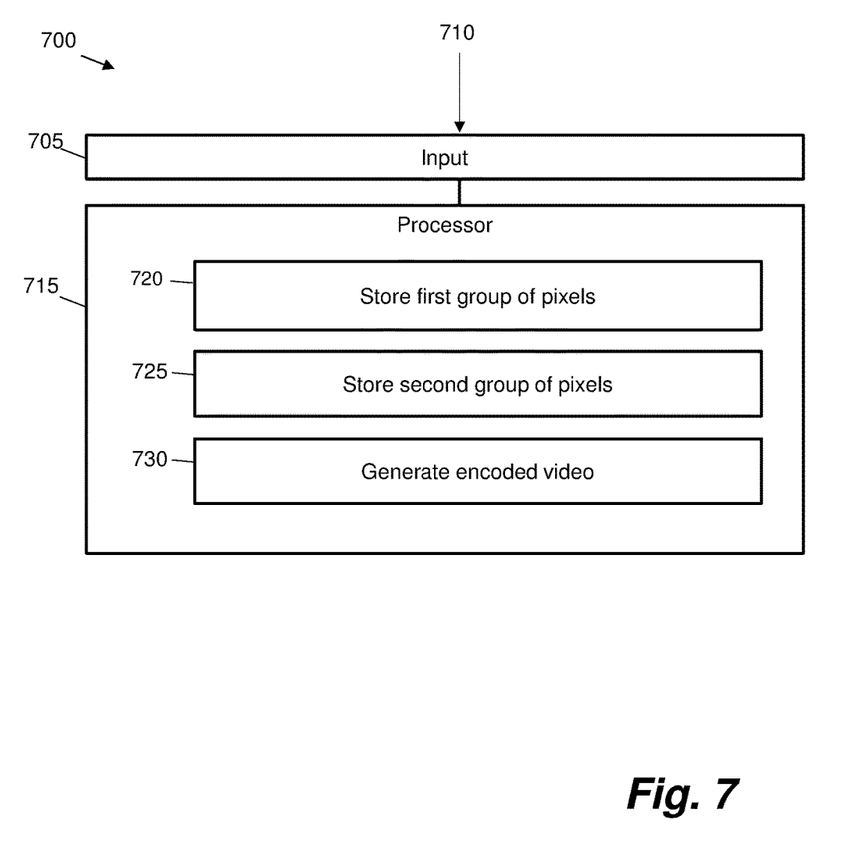
FIG. 7 shows a schematic representation of an apparatus according to an example.

FIG. 7 shows a schematic representation of an apparatus 700 according to an example. The apparatus 700 comprises an input 705 configured to receive an input video frame 710.

The apparatus 700 further comprises a processor 715. The processor is configured to store 720, in a first group of pixels of a video frame to be encoded, first video frame data comprising a representation of pixel values of the input video frame 705. The processor 700 is further configured to store 725, in a second group of pixels of the video frame to be encoded, different to the first group of pixels, second video frame data defining processing that may be applied to the first video frame data whereby to produce a display video frame. For example, the second video frame data may comprise gain information as described above.

The processor 700 is then configured to generate 730 an encoded video, the generating comprising encoding the video frame to be encoded.

In some examples, the apparatus 700 further comprises a transmitter configured to transmit the encoded video to a receiver. The receiver may for example be the receiver 605 described above in relation to FIG. 6. In other examples, the apparatus 700 is configured to transmit the encoded video to a server, for example a streaming server. The server may then be configured to transmit the encoded video to a receiver, for example as streamed video.

Methods of the present disclosure may be implemented by way of a non-transitory computer-readable storage medium comprising a set of computer-readable instructions stored thereon which, when executed by at least one processor, cause the at least one processor to perform a method according to the present disclosure. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read only memory (ROM), an erasable programmable read-only memory, or a portable disc.

The above embodiments are to be understood as illustrative examples. Further embodiments are envisaged. For example, it is described above that gain values corresponding to tone mapping of an input video frame may be stored. Other parameters describing the tone mapping could be stored instead of or as well as the gain values, for example coefficients expressing the shape of local tone curves.

Alternatively, or additionally to gain information, the second video frame data described above may comprise a representation, such as a two-dimensional map, of regions of interest in the input video frame. These regions may then be highlighted in the output video frame. For example, regions of interest may be highlighted in response to a user input requesting such highlighting. It may for example be desirable to highlight human faces in a video from a security camera. As a further example, the second video frame data may comprise depth information indicating depths for reconstruction by a 3D display.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present disclosure, which is defined in the accompanying claims.

The invention claimed is:

1. A method for generating an output video frame, the method comprising:
receiving an encoded video;
decoding the encoded video whereby to produce a decoded video frame;
retrieving first video frame data from a first group of pixels of the decoded video frame;
retrieving second video frame data from a second group of pixels, different to the first group of pixels, of the decoded video frame; and
generating an output video frame by combining information derived from the first video frame data and information derived from the second video frame data, wherein the combining comprises:
for a given pixel of the output video frame, combining information describing the given pixel derived from the first video frame data and information describing the given pixel derived from the second video frame data.

2. The method according to claim 1, wherein the first video frame data comprises a representation of pixel values of an input video frame.

3. The method according to claim 2, wherein generating the output video frame comprises upscaling the representation to a display resolution.

4. The method according to claim 1, wherein:
the second video frame data defines processing that may be applied to the first video frame data, whereby to generate the output video frame; and
the combining information for the given pixel comprises applying the processing to the information describing the given pixel derived from the first video frame data.

5. The method according to claim 4, wherein:
the second video frame data comprises gain information; and
the processing comprises application of at least one gain, based on the gain information, to the first video frame data.

6. The method according to claim 1, wherein the second group of pixels has an area less than one fifth of a corresponding area of the first group of pixels.

7. A method for encoding a video, the method comprising:
receiving information describing an input video frame;
processing the input video frame to generate first video frame data and second video frame data, wherein some information relating to a given pixel of the input video frame is placed in the first video frame data and other information relating to the given pixel of the input video frame is placed in the second video frame data;
storing the first video frame data in a first group of pixels of a video frame to be encoded;
storing the second video frame data in a second group of pixels, different to the first group of pixels, of the video frame to be encoded; and
generating an encoded video, the generating comprising encoding the video frame to be encoded.

8. The method according to claim 7, wherein the first video frame data comprises a representation of pixel values of the input video frame.

9. The method according to claim 8, wherein storing the representation comprises downscaling the pixel values of the input video frame to a resolution corresponding to an area of the first group of pixels.

10. The method according to claim 9, wherein:
the downscaling is a horizontal downscaling, such that the first group of pixels has a width less than a width of the input video frame; and
the second group of pixels is at one side of the first group of pixels.

11. The method according to claim 7, wherein the second video frame data defines image processing applied to the input video frame.

12. A non-transitory computer-readable storage medium comprising a set of computer-readable instructions stored thereon which, when executed by at least one processor, cause the at least one processor to:
receive an encoded video;
decode the encoded video whereby to produce a decoded video frame;
retrieve first video frame data from a first group of pixels of the decoded video frame;
retrieve second video frame data from a second group of pixels, different to the first group of pixels, of the decoded video frame; and generate an output video frame by combining information derived from the first video frame data and information derived from the second video frame data, wherein the combining comprises:

for a given pixel of the output video frame, combining information describing the given pixel derived from the first video frame data and information describing the given pixel derived from the second video frame data.

13. An apparatus for displaying streamed video, the apparatus comprising:

a receiver configured to receive a streamed encoded video;

a decoder configured to, in real time, decode the encoded video whereby to produce a decoded video frame;

a processor configured to, in real time:

retrieve from a first group of pixels of the decoded video frame a representation of pixel values of an input video frame;

retrieve from a second group of pixels of the decoded video frame, different to the first group of pixels, a representation of processing that may be applied to the representation of pixel values; and generate an output video frame, wherein the generating comprises applying the processing to the representation of pixel values, and an output configured to, in real time, output the output video frame to a display.

14. An apparatus comprising:

an input configured to receive an input video frame; and a processor configured to:

store, in a first group of pixels of a video frame to be encoded, first video frame data comprising a representation of pixel values of the input video frame;

store, in a second group of pixels of the video frame to be encoded, different to the first group of pixels, second video frame data defining processing that may be applied to the first video frame data whereby to produce a display video frame; and generate an encoded video, the generating comprising encoding the video frame to be encoded.

15. The apparatus according to claim 14, wherein the apparatus comprises a transmitter configured to transmit the encoded video to a receiver.

* * * * *